United States Patent

Chronister et al.

[11] 3,889,708
[45] June 17, 1975

[54] DUAL BALL LAUNCH VALVE

[75] Inventors: Clyde H. Chronister; Cecil C. Grieger; Alton D. Oliver, all of Houston, Tex.

[73] Assignee: Chronister Development, Inc., Houston, Tex.

[22] Filed: May 17, 1974

[21] Appl. No.: 470,789

[52] U.S. Cl. .................... 137/268; 15/104.06 A
[51] Int. Cl. ............................................ F16k 25/00
[58] Field of Search ................ 137/268; 73/3; 15/104.06 A; 251/159, 172, 343, 344, 345; 285/31, 33, 24; 141/387, 312, 346, 386

[56] References Cited
UNITED STATES PATENTS

| | | | |
|---|---|---|---|
| 3,177,513 | 4/1965 | Ellett | 137/268 X |
| 3,220,432 | 11/1965 | Allen | 137/268 |
| 3,463,448 | 8/1969 | Piccardo | 137/268 X |
| 3,580,539 | 5/1971 | Van Scoy | 137/268 X |

Primary Examiner—Martin P. Schwadron
Assistant Examiner—Robert I. Miller
Attorney, Agent, or Firm—Fulbright & Jaworski

[57] ABSTRACT

A ball launcher having dual compartments for both launching and receiving a ball in which the compartments are oppositely directed. Seal means on the outside of each of the compartments for coacting with telescopic sleeves whereby the seals are isolated from fluid flow for preventing damage to the seals. A valve inlet and a ball insertion conduit both of which are removably connected to the valve housing for providing ease of access to the various valve seals. The seals on the dual compartments are supported from removable inserts for ease of repair and replacement. After the ball has been inserted into the dual launcher, the launcher may be rotated 90 degrees to dump the ball into the outlet, and the second compartment will be adjacent the inlet and is sealed off and used for catching the ball. The operation may be repeated by rotating the launcher 180 degrees.

7 Claims, 4 Drawing Figures

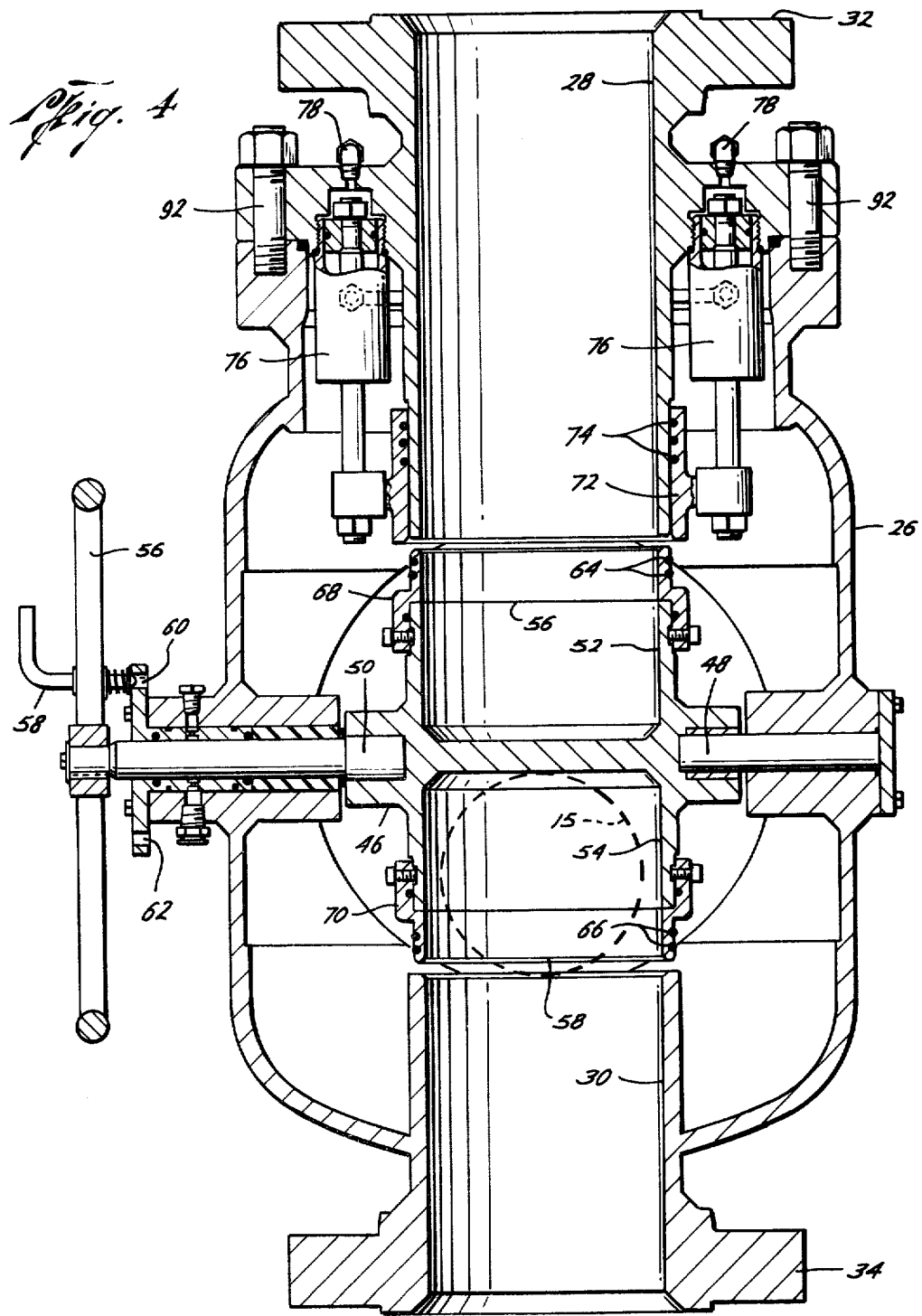

3,889,708

1

DUAL BALL LAUNCH VALVE

BACKGROUND OF THE INVENTION

The present invention is directed to a valve for launching balls and can be used in a meter prover, for separating fluid products, or for cleaning lines.

Meter provers are conventionally used to check mechanical meters or other measuring devices for accuracy by comparing the measurement to a known volume of fluid measured by the meter prover. The meter prover measures a known volume of fluid between two detectors by allowing the fluid to be measured by moving a ball through the prover which actuates the detectors. The present invention is directed to an improvement in a valve for launching a ball, such as through a meter prover, or for separating different products or merely for cleaning pipelines, and for receiving the ball after it has performed its function.

Various improvements are directed to the valve such as providing a dual launch having oppositely directed compartments, one of which launches the ball while the second is in position to receive and catch the ball when it completes its run, various seals are positioned exteriorly of the flow path so as to be isolated and not subject to damage by debris in the pipeline, the seals are easily removable for repair and replacement and ease of access to the seals is provided.

SUMMARY

The present invention is directed to a dual ball launch valve in which the housing has an inlet, an outlet and a ball insertion conduit. A rotatable ball launcher having first and second compartments having seal means is positioned in the housing for bringing the compartments into alignment with the inlet, outlet and insertion conduit. A sleeve is telescopically and sealingly positioned on the inlet and the ball insertion conduit and are connected to means for extending and retracting the sleeves into a telescopic engagement with the seals on the dual compartments.

Still a further object of the present invention is providing the compartments in axial alignment with each other and with their respective ends oppositely opposed whereby one compartment may release a ball while the second compartment is sealed off and is in position for catching the ball and removing it from the line.

Still a further object of the present invention is the provision that the ball insertion conduit and the inlet conduit are removably connected to the housing for providing access to the various seals for repair and replacement.

Still a further object of the present invention is the provision of supporting the seals on the outside of the compartments from removable inserts.

Other and further features, and advantages will be apparent from the following description of the preferred embodiment.

2

Figure 1:
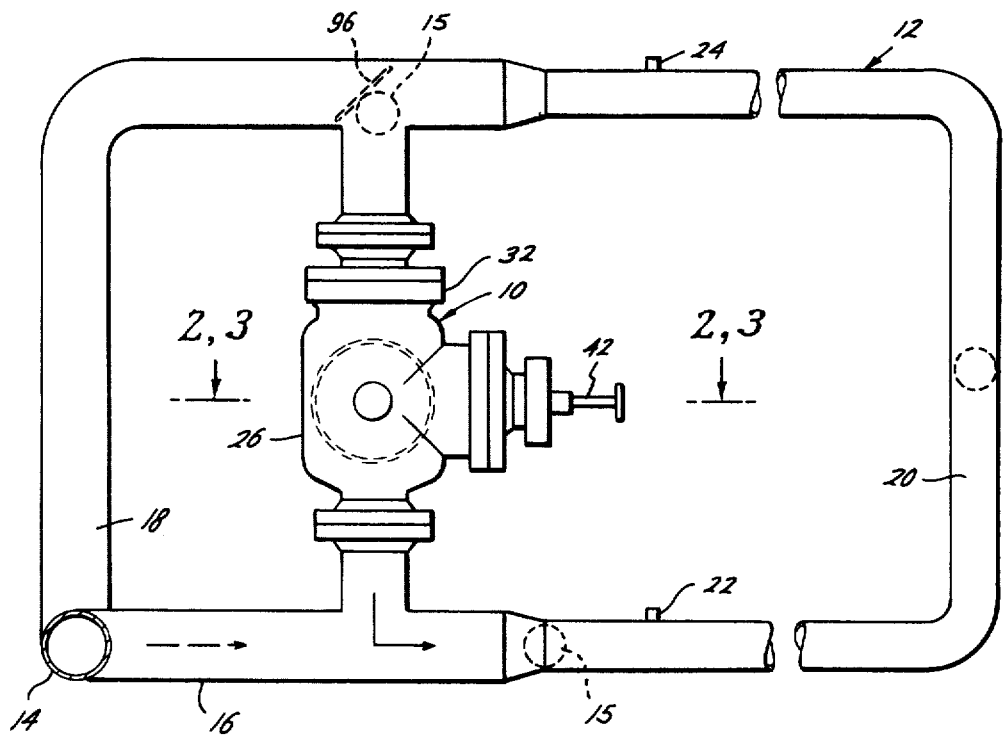
FIG. 1 is an elevational view of a meter prover utilizing the dual ball launch valve of the present invention.
Figure 2:
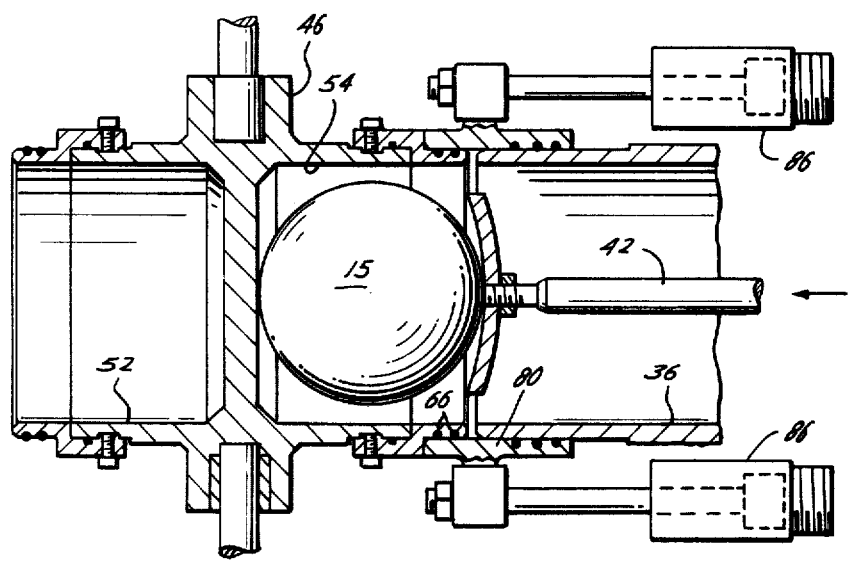
FIG. 2 is a fragmentary cross-sectional view taken along the line 2—2 of FIG. 1 showing a ball being inserted into the launcher.
Figure 3:
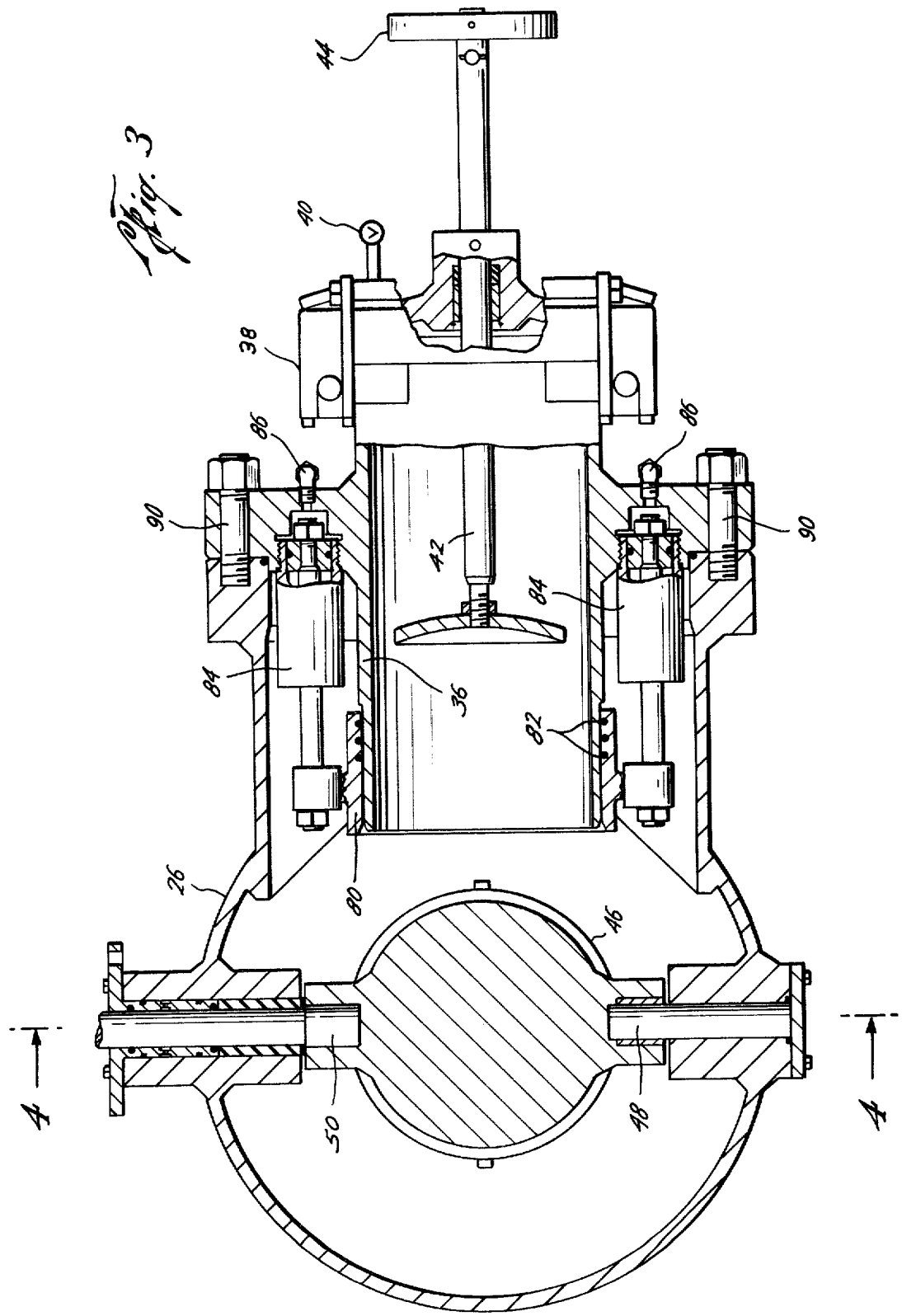

FIG. 3 is a cross-sectional view taken along the line 3—3 of FIG. 1 showing the ball launcher rotated 90 degrees to the position shown in FIG. 2, and FIG. 4 is a cross-sectional view taken along the line 4—4 of FIG. 3.

DESCRIPTION OF THE PREFERRED EMBODIMENT

Referring now to the drawings and particularly to FIG. 1, the reference numeral 10 generally indicates the dual launch valve of the present invention and for purposes of illustration only is shown used in a meter prover generally indicated by the reference numeral 12, although it is understood that the valve 10 is useful in other types of installations and for other uses.

The meter prover 12 is connected to a main pipeline 14 connected to the inlet 16 of the meter prover 12 and to the outlet 18 of the meter prover 12 by suitable valves (not shown). The prover 12 includes a prover barrel 20 having a first detector 22 and a second detector 24 which are connected to conventional equipment (not shown) for measuring the interval required for a ball to move between the detectors 22 and 24. The meter prover 12 is used for proving the accuracy of a meter or other mechanical measuring device in the main line 14 by measuring the known volume of fluid between the two detectors 22 and 24 using a ball of resilient material that has a diameter slightly greater than the internal diameter of the prover barrel 20. The fluid in the main line 14 moves the ball through the prover barrel 20 past the first detector 22 where the meter counter starts registering the known volume between detectors 22 and 24 and when the ball reaches the detector 24 the volume between the two detectors is verified and compared with the measurement on the meter that is being calibrated for accuracy. The valve 10 is for the purpose of receiving the ball, launching the ball into the meter prover 12, and catching the ball after it has passed through the meter prover 12.

Referring now to FIG. 4, the valve 10 includes a housing 26 having an inlet conduit 28 and an outlet conduit 30 which are axially aligned with each other and extend into the housing 26. A flange 32 is connected to the inlet conduit 28 and a flange 34 is connected to the outlet conduit 30 for connection to the outlet and inlet, respectively, of the meter prover 12 for launching a ball through the meter prover 12 and catching the ball after it has passed through the meter prover 12.

Referring now to FIG. 3, a ball insertion conduit 36 is connected to and extends into the housing 26 for inserting and removing a ball into and from the valve 10. The insertion conduit 36 includes a closure member 38, a bleed valve 40 and a push rod 42 which may be actuated by a handle 44 for pushing the ball out of the conduit 36 and into either ball holding compartment 52 or 54.

Referring now to FIGS. 3 and 4, a ball launcher 46 is provided which is rotatably supported in the housing, such as by trunnions 48 and 50, adjacent the inside ends of the inlet 28, the outlet 30, and the insertion conduit 36. The launcher 46 includes a first ball holding compartment 52 and a second ball holding compartment 54. The compartments 52 and 54 include open ends 56 and 58, respectively, and the compartments 52 and 54 are coaxially aligned, but the ends 56 and 58 are oppositely directed whereby when one of the ends is aligned with the outlet conduit 30, the second end will be aligned with the inlet 28, as will be more fully described hereinafter. The compartments 52 and 54 may be rotated on the trunnions 48 and 50 to selectively bring the compartments 52 and 54 into alignment with the inlet 28, the outlet 30, or the conduit 36. Any suitable means may be provided such as a wheel 56 connected to the trunnion 50 for moving the compartments 52 and 54 to the desired position. The wheel 56 may include a pin 58 which may be releasably connected to a plurality of holes including 60 or 62 attached to the housing 26 for selectively aligning the compartments 52 and 54 as desired. Seal means are provided adjacent the open ends 56 and 58 of the compartments 52 and 54, respectively, and positioned on the outside of the compartment, such as seals 64 and 66, respectively. The seals 64 and 66 are preferably supported from replaceable seal inserts 68 and 70, respectively, for ease of removal for repair or replacement. It is to be noted that the seals 64 and 66 are positioned outside of the flow path of the fluid and therefore are not subject to debris and other foreign matter passing through the pipeline and prover which damage the seals.

Referring to FIG. 4, a sleeve 72 is telescopically positioned on the interior end of the inlet 28 and seals against the inlet by seal means 74. The sleeve 72 may be expanded and retracted by one or more hydraulic piston and cylinder assemblies 76 which are operated through fluid lines 78 by suitable controls (not shown). The sleeve 72, when extended, may telescopically engage the open ends 56 and 58, respectively, of the compartments 52 and 54 when they are aligned with the inlet 28 and sealingly engage the seals 64 and 66, respectively. The sleeve 72 is retracted to allow the launcher 46 to rotate.

Referring now to FIG. 3, a sleeve 80 is provided telescopically engaging the inner end of the ball insertion conduit 36 and sealingly engaged therewith by one or more seal means 82. The sleeve 80 is adapted to be extended and retracted by one or more hydraulic piston and cylinder assemblies 84 which are controlled through hydraulic lines 86. As best seen in FIG. 3, the sleeve 80 is retracted to allow the ball launcher 46 to rotate, and as best seen in FIG. 2, the sleeve 80 is extended to engage one of the compartments such as compartment 54 and seal against seals 66 when a ball 15 is being inserted into or removed from the ball launcher 46.

Referring again to FIG. 3, it is noted that the ball insertion conduit 36 is connected to the valve housing 26 by a plurality of bolts 90 for suitably removing the conduit 36 from the housing 26 in order to conveniently have access to the seals 64 and 66 on the launcher 46 and/or the seals 82 on the sleeve 80 for repair or replacement. Similarly, and referring to FIG. 4, the inlet 28 is releasably connected to the valve body 26 by a plurality of bolts 92 to provide access to the interior of the valve for repair or replacement of the various seals.

In use, the ball launcher 46 is rotated to place one of the compartments, as best seen in FIG. 2, such as 54, in alignment with the ball insertion conduit 36 and the sleeve 80 is extended by the hydraulic piston and cylinder 86 to bring the sleeve 80 into sealing engagement with the launcher seals 66. The conduit 36 is now sealed off from fluid in the line 14, in the prover 12 and in the interior of the valve housing 26. Pressure trapped in the conduit 36 is released by means of bleed valve 40. The valve closure member 38 is opened and ball 15 is inserted into the conduit 36. The closure 38 is closed and the handle 44 is actuated to move the push rod 42 inwardly to push the ball 15 into the compartment 54. The bleed valve 40 is closed. The piston and cylinder assemblies 86 are then actuated to retract the sleeve 80 from engagement with the compartments 54.

As best seen in FIG. 4, the operator wheel 56 is rotated to rotate the ball launcher 46 to move the compartment 54 holding the ball 15 into alignment with the outlet 30, and simultaneously brings the compartment 52 into alignment with the inlet 28. The ball 15 is dropped through the outlet 30 and the sleeve 72 on the inlet 28 is extended by the piston and cylinder assemblies 76 to bring the sleeve 72 into sealing engagement with the launcher seals 64 preventing line fluid passing through valve 10 and bypassing the prover 12. As fluid is flowing from the main line 14, through inlet 16 to the meter prover 12, the ball 15 is carried through the meter prover 12 actuating the first detector 22 starting the prover counter. The ball moves around the prover barrel 20 and actuates the second detector 24 completing the measured volume between the detectors 22 and 24. The ball 15 continues until it contacts a perforated deflector 96 causing the ball to drop downward into the inlet conduit 28 and into the waiting compartment 52. The dual launch valve 10 may make additional meter runs by retracting the sleeve 72, rotating the operator wheel 56 to rotate the launcher 46 180 degrees to drop the ball into the meter run 12 and again extending the sleeve 72 into sealing engagement with the compartment 54 and catching the ball when it completes its run. When the meter proving is complete, the ball launcher 46 is rotated 90 degrees into mid-position as indicated in FIG. 2 for retrieving the ball from the insertion conduit 36.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. A dual ball launch valve for launching and receiving a ball in a line comprising, a housing having an inlet and outlet for connection to the line, a ball insertion conduit extending into the housing for inserting and removing a ball into and from the valve, a rotatable ball launcher positioned in the housing having first and second ball receiving compartments separated by a fluid barrier, said compartments including a tubular open end positioned to be brought into alignment with the conduit, inlet and outlet on rotation of the launcher, seal means adjacent the open end of each of the compartments positioned on the outside of the compartments, means for rotating the launcher, a sleeve telescopically and sealingly positioned on the outside of each of the inlet and the conduit and sized to telescopically engage the exterior of the open ends of said compartments and said seal means when a compartment is aligned with a sleeve, and means operable from outside the housing for extending and retracting said sleeves into a telescopic engagement with the seal means on the tubular compartments of the launcher.

2. The apparatus of claim 1 wherein the compartments are axially aligned with their respective open ends positioned 180° from each other.

3. The apparatus of claim 1 wherein the ball insertion conduit is removably connected to the housing.

4. The apparatus of claim 1 wherein the seal means on the open ends of the compartments are supported from removable inserts.

5. The apparatus of claim 1 wherein the means for extending and retracting the sleeves include hydraulic piston and cylinders.

6. The apparatus of claim 1 wherein the inlet is removably connected to the housing.

7. A dual ball launch valve for launching and receiving a ball in a line comprising, a housing having a inlet and outlet axially aligned with each other for connection in a line, said inlet being removably connected to the housing, a ball insertion conduit removably connected to the housing and extending into the housing for inserting and removing a ball into and from the valve, a ball launcher rotatably positioned in the housing adjacent the inlet, outlet and insertion conduit, said launcher having first and second ball receiving compartments, said compartments each including an open end positioned to be brought into and out of alignment with the conduit, inlet and outlet on rotation of the launcher, said compartments being axially aligned with their respective open ends oppositely directed, seal means adjacent the open end of each of the compartments and positioned on the outside of the compartments and supported from removable inserts, means for rotating said launcher, a sleeve telescopically and sealingly positioned on each of the inlet and the insertion conduit, and means for extending and retracting said sleeves into a telescopic engagement with the seal means on the compartments of the launcher.

* * * * *